Oct. 26, 1965   A. E. KATZER ETAL   3,214,564
METHOD OF JOINING METALS
Filed May 27, 1963

INVENTORS
Albert E. Katzer &
BY Robert O. Houghtaling

C. W. Christen
ATTORNEY

United States Patent Office 3,214,564
Patented Oct. 26, 1965

3,214,564
METHOD OF JOINING METALS
Albert E. Katzer, Farmington, and Robert O. Houghtaling, Detroit, Mich., assignors to General Motors Corporation, Detroit, Mich., a corporation of Delaware
Filed May 27, 1963, Ser. No. 283,297
7 Claims. (Cl. 219—92)

This invention relates to a method of joining metals, and more particularly to a resistance welding method in which a gauze material is interposed between the surfaces to be joined thereby increasing the resistivity at the joint making it possible to join high conductivity and refractory metals alike.

Resistance welding relies on the fact that a resistance is offered by the metal to the passage of an electric current. If the current is great enough, any metal will become heated to a degree depending upon the resistivity offered, and the greater the resistance the greater the heat resulting for the passage of current through the metal.

Normally resistance welding is carried out by locating the surfaces to be joined in overlapping abutting relationship wherein the greatest resistance to the current flow path is the interface at the joint. By forcing an electric current through the interface, heating occurs there to a greater extent than at other current carrying portions of the work with the result that the melting point of the metal at the joint is reached first. Pressure is applied until the molten metal solidifies to form a weld. This method is commonly manifested in spot welding, projection welding, and butt welding techniques all of which are widely practiced methods for joining metals.

From what has been said, it can be seen that the heating effect for any given current value depends upon the metal being welded; for example, stainless steel, nickel, and similar metals weld with low current values while aluminum, magesium, and copper base alloys have a lower resistivity and weld only at high current values. Dissimilar metals may be welded, but it should be recognized that those possessing more nearly similar electrical resistance characteristics are easiest to join and conversely, metals with the greatest difference in resistivity and melting points are more difficult to join.

As a practical matter, it is desirable that the temperature gradient drop off rapidly from the joint to prevent physical changes in metals where high temperature phase transformations and recrystallization are a factor. It is also important that the resistance at the joint exceed the resistance at the electrode work interface, otherwise melting may occur where the electrodes contact the work surface even though the electrodes are normally water cooled.

If a metal is suitable for a resistance welding process without significant metallurgical change from recrystallization or the like, we say it has good weldability. For example, refractory metals such as tungsten and molybdenum alloys and metals of this class exhibit poor weldability in that they have high melting points and recyrstallization temperatures with the result that they are usually joined by brazing. Conversely, high conductivity metals, such as copper, and aluminum base alloys are not easily welded at lower current values because their resistivity is low and their melting points are high enough to avoid being fused unless more power is used and all have relatively low recrystallization temperatures. In the welding of certain steels the cooling rate is of particular importance. Alloy steels are particularly difficult to weld because the best metallurgical structures for structural applications are not obtained in the rapid cooling environment of resistance welding and the same is true of higher carbon steels, such as those alloyed with more than 0.15 carbon.

Since the joint contact resistance is so important in resistance welding, our attention has been directed to improving the weldability of otherwise poorly weldable metals by concentrating on this aspect. For example, if it were possible to increase the resistance at the joint interface and dissipate heat after the weld nugget was formed, the thermal gradient in both directions away from the weld zone would rapidly decrease and the metallurgical properties of the work in the vicinity of the weld would remain substantially unchanged.

Another advantage which could be obtained if the contact resistance were increased would be a reduction in the power requirements to weld higher conductivity metals and possibly the elimination of projection welding in many applications where this type of welding was formerly used.

Another possibility is that the metals having dissimilar physical properties could be more readily joined by resistance heating because of the higher temperatures at the joint.

Still another advantage incident to high contact resistance would be smaller spot weld indentations since the metal away from the weld zone would not soften.

These goals are achieved with the present invention which includes in an electrical resistance heating method the steps of locating the surfaces to be joined in overlapping spaced relationship;

Placing a resistance material between the overlapping surfaces, said material introducing a plurality of contact resistance points due to its construction;

Moving the surfaces into electrical conductive contact with the contact resistance points;

Causing an electric current to flow through the resistance points which concentrate the heating effect locally to produce a narrow fusion zone; and Applying pressure to force the surfaces toward each other forming a bond therebetween when the fusion zone solidifies.

For an understanding of the invention in more detail, reference is made to the following description and drawings wherein.

Figure 1:
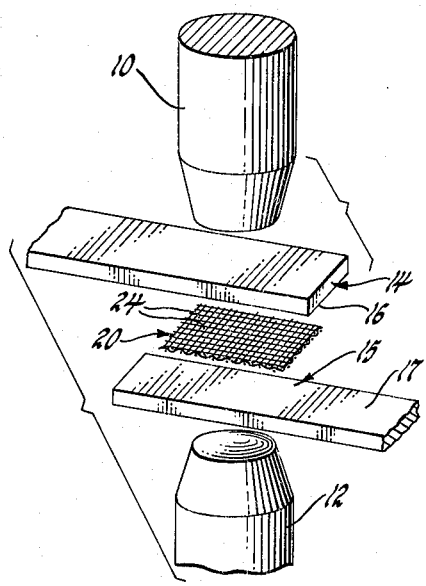
FIGURE 1 depicts the arrangement of the work prior to being welded with a gauze material positioned therebetween.

Referring to FIGURE 1, the electrode area of a standard spot welding machine is depicted wherein water cooled electrodes 10 and 12 are connected at their ends to the machine platens (not shown) and are spaced in the work area. It is understood that the welding machine will include a transformer to reduce the incoming voltage and to increase the current passing between the electrodes and an operating switch to turn the current on and off at the transformer; other types of resistance heating apparatus may be used, such as seam or butt welding equipment. For purposes of discussion, electrode 10 is referred to as the movable electrode and electrode 12 is regarded as the backup electrode. The work is illustrated as two flat metal strips 14 and 15 having inner adjacent surfaces 16 and 17 to be joined and may be composed of metals having similar physical properties such as molybdenum alloys, tungsten carbide and metals of this class; or conversely, may be made of lower melting metals such as brass, bronze, or aluminum alloys or any metals of this general class. Positioned between the strips 14 and 15 is a multi-strand interwoven gauze material 20 the characteristics and properties of which will now be described.

Normally resistance welding techniques do not employ a supplementary material at the joint to increase resistance but rather rely on the natural interface resistance to heat the work to its melting point. If the joint resistance is low, as in high conductivity metals, large amounts of current are needed. Also if the contact resistance at the interface is nearly equal to the contact resistance between the work and electrodes, as would be the case with most copper base alloys for example, then melting is likely to occur at the electrode-work interface and not at the joint.

Figure 2:
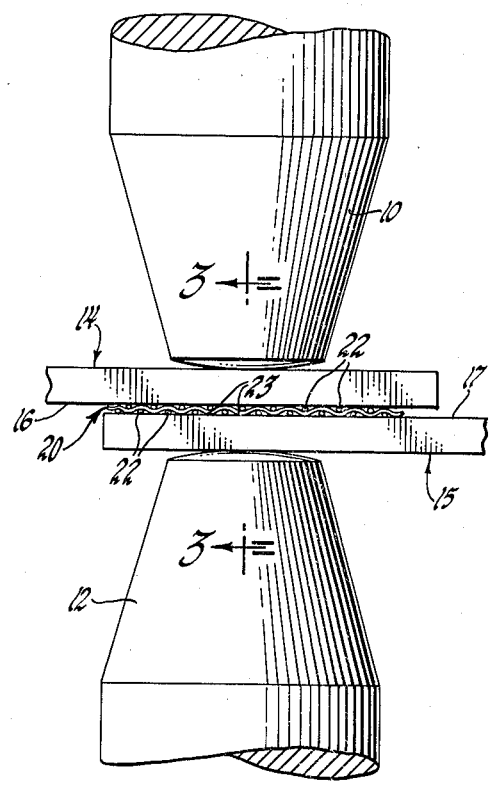
FIGURE 2 illustrates the position of the work and gauze at the start of the welding cycle.

FIGURE 2 shows the initiation of the welding cycle with the primary electrode 10 being lowered forcing the work pieces 14 and 15 together and sandwiching the gauze material 20 therebetween. The introduction of the gauze 20 between the surfaces 16 and 17 places in the path of the current a great many resistance points 22 formed by the crossing strands 23 which effectively multiply the joint resistivity because the electrical path is changed from what would have been a single interface plane surface to one having a multi-point contact pattern. Furthermore, the strands or filaments 23 which are woven to make up the gauze may be selected from a material having a high natural resistance additionally increasing the joint resistivity; hence, the manufacturer may vary the resistance somewhat by selecting the proper filament material and controlling the mesh size.

We have found for low melting point, high conductivity metals such as brass, aluminum, and bronze; that stainless steel filaments produce the proper resistance differential. That is, if the resistance of the gauze is about four times that of the metals to be welded then superior results are obtained. Of course, other filament materials may be chosen, but a resistance differential of about four should be maintained.

One additional factor must be considered, low melting point metals, such as brass, will become fused while the high resistance gauze will have a higher melting point and will not. Hence, in order to effect a weld, the spaces 24 between the interwoven filaments 23 must be great enough to allow intermingling of the molten metal from the surfaces 16 and 17. When the melting point is reached, a gridiron pattern of fused metal will form in the interwoven spaces which upon the application of pressure is merged into a narrow weld zone 25 approximately the thickness of the gauze 20 as depicted in FIGURE 3.

We have found that a mesh size that is too fine will not permit a proper metal flow through the interwoven spaces 24. For example, a 35 mesh gauze having a filament diameter of about 0.012 inch with openings of about 417 microns will be unsatisfactory when welding silicon or manganese brass while a 24 mesh gauze with 0.014 inch strands and openings of approximately 701 microns has produced a satisfactory weld. Only normal welding pressures were required with the 24 mesh gauze, while conceivably much higher pressures would be needed if the opening size were diminished. Naturally we refer to mesh size as a convenient reference, but this does not imply that the openings 24 must be square, they could be any shape so long as the general sieve range is maintained.

Figure 3:
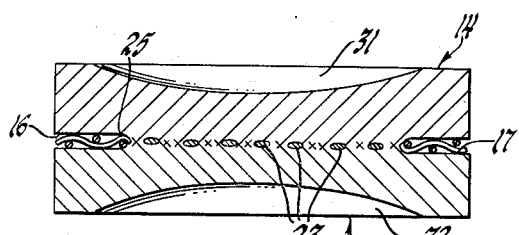
FIGURE 3 is an enlarged view in section taken along line 3—3 of FIGURE 2 showing the completed weld for a high conductivity, relatively low melting point metal.

As may be seen by inspection in FIGURE 3, the strands or wires 23 in the melt zone 25 are not fused and do not take part in the metallurgical bond between the two surfaces, however, some mechanical reinforcement is to be anticipated. Depressions 31 and 32 are made by electrodes 10 and 12 respectively, and will be less pronounced than if a standard resistance welding method were employed. This is probably because a smaller melt zone extending away from the inner adjacent surfaces 16 and 17 is produced; hence, a greater portion of the work is not softened and is able to resist the indenting force of the electrodes. This naturally leads to more appealing surface finishes.

Other advantages appear. Since the heating effect is localized at the joint, the possibility of recrystallization is reduced to the area adjacent the weld zone. Furthermore, after the weld is formed the strands 23 tend to act as radiators, dissipating heat from the joint that otherwise would be absorbed by the work. This recrystallization problem arises particularly in copper base alloys which have a recrystallization temperature range beginning at about 390° Fahrenheit.

Figure 4:
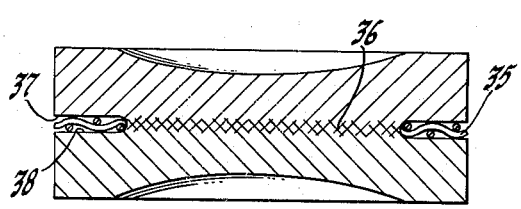
FIGURE 4 illustrates in enlarged section a completed weld for a higher melting metal wherein the gauze metallurgically contributes to the bond.

In welding higher melting point metals, such as high carbon steels, a joint temperature is reached that is above the melting points of the two parts to be welded as well as that of the gauze. In this case, as illustrated in FIGURE 4, the gauze 35 actually enters into the metallurgical bond 36 between the two surfaces 37 and 38. That is, the gauze melts and alloys with the base metal. The same advantages obtain as previously described in that a great many contact resistance points produce a higher joint temperature for a given welding current. Again the weld zone 36 will be narrow and the temperature gradient away from the weld zone will be steep, this is particularly important in heavy section high carbon steels. For example, if the cooling rate is too great, which is almost always the case with resistance welding, a martensitic structure will form to a considerable distance away from the weld interface. In the present invention this tendency is reduced since the weld nugget growth is restricted; in addition the percentage of alloying of the base metal with the gauze in the weld zone will tend to produce an austenitic structure at the joint which is desirable for most applications.

We have found that a 100 mesh gauze with a wire size in the order of 0.004 inch produces a satisfactory weld in this case. Naturally since the wire tends to alloy with the base metal, its composition must be taken into consideration and its natural resistivity should be high.

Figure 5:
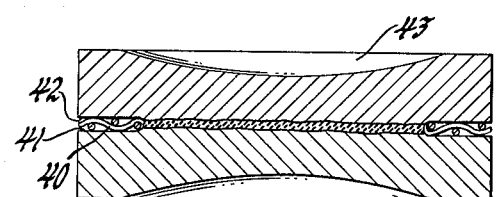
FIGURE 5 shows in enlargement a bond between more refractory and dissimilar metals which may be regarded as a braze in which the gauze functions as a brazing alloy.

When welding higher refractory and dissimilar metals such as tungsten carbide and alloy steels, these higher melting metals are not actually welded and the bond may more properly be regarded as a brazed joint, in which case the gauze acts as a brazing alloy. In FIGURE 5, a layer 40 may be seen which was originally a gauze material similar to that employed in FIGURE 4. The gauze became fused, and relying on the diffusion rate at the two interfaces 41 and 42, brazed the inner adjacent surfaces of the work 43 and 44. In applications, such as joining a tungsten carbide cutting tool insert to its steel holder, a good joint may be achieved using nickel gauze at 100 mesh with a 0.004 inch filament size. The nickel layer will act as a cushion between the tool insert and holder to absorb shocks in addition to its function as a brazing alloy in forming the joint.

FIGURES 3–5 are representative enlargements of finished welds without showing the microstructures of specific metals and though specific metals are referred to, it will be understood by those familiar in this art that obvious applications of the invention to other metals or materials can be made without deviating from the intended scope of the appended claims, except insofar as they are limited by the prior art.

What is claimed is:
1. A method of electrical resistance welding relatively high conductivity metals comprising the steps of;
   locating the inner adjacent surfaces to be joined in overlapping spaced relationship;
   placing a gauze material between the overlapping sur- faces, said gauze material introducing a plurality of contact resistance points having a total resistance greater than the natural resistivity of the metals being joined due to its interwoven construction;

moving the surfaces into electrical conductive contact with said resistance points;

causing an electric current to flow through the resistance points which concentrate the heating effect locally fusing the surfaces but not the gauze material; and applying pressure to force the molten metal of the surfaces through the interwoven construction of the gauze to form a weld upon solidification.

2. The method according to claim 1 wherein the gauze material is composed of metallic filaments having an interwoven spacing to provide openings in the gauze material of not substantially less than 417 microns.

3. The method according to claim 2 wherein said metallic filaments are interwoven at substantially 24 mesh and have a diameter of about 0.014 inch.

4. The method according to claim 2 wherein said metallic filaments have a resistivity substantially four times greater than either of the metals being welded.

5. The method according to claim 2 wherein said metallic filaments are made of stainless steel.

6. A method of electrical resistance welding relatively high conductivity metals comprising the steps of;

locating the inner adjacent surfaces to be joined in overlapping spaced relationship;

placing a metallic gauze between the overlapping surfaces, said gauze being composed of filaments having a resistance greater than either of the metals to be joined and the contact resistance at the electrode-work interfaces, and introducing a plurality of contact resistance points between the surfaces due to its interwoven construction;

moving the surfaces into electrical conductive contact with said contact resistance points;

causing a current to flow through said resistance points which concentrate the heating effect locally fusing the surfaces but not the gauze; and applying pressure to force the molten metal of the surfaces to flow through the interwoven construction of the gauze forming a weld upon solidification.

7. A method of electrical resistance welding relatively high conductivity metals comprising the steps of;

locating the inner adjacent surfaces to be joined in overlapping spaced relationship;

placing a multi-strand interwoven metallic gauze between the overlapping surfaces having a bulk resistance in the order of four times greater than either metal being welded, the strands of said gauze crossing to form contact resistance points and providing an interwoven spacing of not less than 417 microns;

moving the surfaces into electrical conductive contact with said resistance points;

causing a current to flow through the resistance points which concentrate the heating effect locally fusing the surfaces but not the gauze; and applying a pressure to force the molten metal of the surfaces through the interwoven construction of the gauze forming a weld upon solidification.

References Cited by the Examiner

UNITED STATES PATENTS 1,509,384  9/24  Walter et al. _____ 219—118

FOREIGN PATENTS 24,958  1909  Great Britain.

RICHARD M. WOOD, *Primary Examiner.*